United States Patent
Campayo Esteban et al.

(10) Patent No.: US 10,234,569 B2
(45) Date of Patent: Mar. 19, 2019

(54) DOSIMETRIC CONTROL SYSTEM

(71) Applicant: Ingenieria Y Marketing, S.A., Valencia (ES)

(72) Inventors: Juan Manuel Campayo Esteban, Valencia (ES); José Ignacio Rosello Garcia, Valencia (ES); José Enrique Moliner Sanchez, Valencia (ES); Jesús Lacalle Bayo, Valencia (ES)

(73) Assignee: Ingenieria y Marketing S.A., Valencia (ES)

( * ) Notice: Subject to any disclaimer, the term of this patent is extended or adjusted under 35 U.S.C. 154(b) by 0 days.

(21) Appl. No.: 15/563,186

(22) PCT Filed: Mar. 31, 2015

(86) PCT No.: PCT/ES2015/070256
§ 371 (c)(1),
(2) Date: Sep. 29, 2017

(87) PCT Pub. No.: WO2016/156629
PCT Pub. Date: Oct. 6, 2016

(65) Prior Publication Data
US 2018/0341026 A1    Nov. 29, 2018

(51) Int. Cl.
| | | |
|---|---|---|
| *G01T 1/00* | (2006.01) |
| *G01T 1/02* | (2006.01) |
| *G01T 1/175* | (2006.01) |
| *H02J 50/10* | (2016.01) |
| *G01T 7/00* | (2006.01) |

(52) U.S. Cl.
CPC ............. *G01T 1/02* (2013.01); *G01T 1/175* (2013.01); *G01T 7/00* (2013.01); *H02J 50/10* (2016.02)

(58) Field of Classification Search
CPC ...... A61N 5/1048; A61N 5/1071; G01T 1/02; G01T 1/026
See application file for complete search history.

(56) References Cited

U.S. PATENT DOCUMENTS

| | | |
|---|---|---|
| 4,240,992 A | 12/1980 | Petrie et al. |
| 4,461,952 A | 7/1984 | Allemand et al. |

(Continued)

FOREIGN PATENT DOCUMENTS

| | | |
|---|---|---|
| EP | 0450992 A1 | 10/1991 |
| EP | 0487432 A2 | 5/1992 |

(Continued)

*Primary Examiner* — David P Porta
*Assistant Examiner* — Mamadou Faye
(74) *Attorney, Agent, or Firm* — Richard M. Goldberg (57) ABSTRACT

A dosimeter with at least one radiation sensor and a rechargeable electrical accumulator, includes a single sensor for sinusoidal X-radiation and for γ (gamma) radiation, a filter for the radiation sensor, a first amplification stage for the sensor, a circuit for processing the signal received by the sensor, and converting the signal into a dose value or a value that can be interpreted as a dose, a memory module in which the information on the dose received in the fixed period is stored, a circuit for recharging the electrical accumulator and a communications module, a dosimeter monitoring device, which includes at least one base for recharging the dosimeter with a recharging circuit, and a system for communication with the dosimeter.

9 Claims, 5 Drawing Sheets

(56) References Cited

U.S. PATENT DOCUMENTS

| | | | | |
|---|---|---|---|---|
| 5,055,691 | A | * | 10/1991 | Burgess .................. G01T 1/026 250/370.01 |
| 6,031,454 | A | * | 2/2000 | Lovejoy .................. G01T 1/026 250/388 |
| 2002/0079439 | A1 | | 6/2002 | Croydon et al. |
| 2004/0119591 | A1 | * | 6/2004 | Peeters .............. G08B 21/0222 340/539.26 |
| 2004/0129888 | A1 | | 7/2004 | Kannan et al. |
| 2010/0156193 | A1 | | 6/2010 | Rhodes et al. |
| 2014/0002239 | A1 | * | 1/2014 | Rayner .............. G08B 13/1427 340/5.61 |
| 2014/0299783 | A1 | * | 10/2014 | Valentino .............. G01J 1/0488 250/394 |
| 2017/0205512 | A1 | * | 7/2017 | Asselot .................... G01T 1/02 |

FOREIGN PATENT DOCUMENTS

| | | |
|---|---|---|
| ES | 205121 | 8/1952 |
| ES | 297495 | 3/1964 |
| ES | 482308 A1 | 7/1979 |
| ES | 8704641 A1 | 11/1985 |
| ES | 2215490 A1 | 10/2004 |
| FR | 2973116 A1 | 9/2012 |

\* cited by examiner

DOSIMETRIC CONTROL SYSTEM

BACKGROUND OF THE INVENTION

This invention consists of a personal dosimeter for monitoring the doses of ionizing radiation received by people regularly subject to such radiation, which normally comprises a radiation sensor, which instantly records the doses of sinusoidal or impact γ (gamma) and X-radiation received, and possibly a second sensor identical to the previous one, particularly for detecting square-wave X-radiation, and also comprises an electronic circuit with a discriminator of the doses in accordance with their wavelength and/or energy intensity, a memory bank in which the history and nature of these doses are stored, a rechargeable electric accumulator and a communications module.

This invention also comprises a dosimeter reading device.

Ionizing radiation is radiation with sufficient energy to pull one or more electrons from an atom or molecule, disconnecting these from their bonding to the atom or molecule which contains them. This radiation can be formed of particles, such as alpha or beta particles, or of electromagnetic radiation, such as γ (gamma) rays or x-rays.

In the natural world there are sources which generate ionizing radiation in the earth's crust, and also others coming from the exterior, the latter being filtered by the different layers of the earth's atmosphere.

Ionizing radiation also comes from artificial sources, such as x-ray generators or particle accelerators.

X-radiation rays are normally sinusoidal, and γ (gamma) rays take the form of peaks or impacts. There are also devices, especially in electro-medicine, which generate X-radiation in the form of a square wave.

People's regular exposure to ionizing radiation must be controlled according to the proper regulations. These regulations also establish the need to set up a centralised national network of exposure to radiation, or an individual radiological follow-up document for each outside worker.

It is thus required for people who are regularly exposed to ionizing radiation to have a device for monitoring and evaluating the doses received, so as to also establish the proper corrective measures, for example by carrying out activities not subject to ionizing radiation or by increasing the devices for radiological protection such as protective suits.

Dosimeters are instruments for measuring the dose absorbed in a context of radiological protection.

STATE OF THE ART

There are pocket or "pen" dosimeters (so-called because of their size and shape) in which an electrical charge and the voltage from a condenser is modified by the ionizing radiation received. This radiation reading is mechanically displayed on a visual display with a scale. The amount of the reading is reset in each cycle. These devices are nevertheless only useful for finding out the specific dose and are not conceived for making, nor able to make, a record of the radiation received over time.

The value displayed can be zeroed with a new charge. Pocket dosimeters can record X ray radiation and γ (gamma) radiation as well as beta radiation (with losses that vary depending on the material's capacity for beta penetrability).

Film dosimeters consist of a sealed radiographic plate which is over time gradually exposed through the impact on this film of the radiation received. Film dosimeters are regularly developed in a laboratory in more or less regular periods of time. These dosimeters are strictly personal, since if two different people used them it could not be determined which of them had received which dose. The plate is furthermore disposable, with a new plate being required after each development. Each person must furthermore have at least two dosimeters, since while the developing is being done the user needs to have another unit for dosimetric monitoring. Apart from this, the dose received is not known until the full cycle time has elapsed and the results are obtained from the laboratory. This also requires the manual registration of the data obtained in the corresponding database in which the individual doses are recorded. A change of laboratory and/or supplier of the devices may mean that the dose accumulated by someone is not reliably and directly known, with the ensuing risks for health. Another characteristic is that the film does not discriminate the intensity or variety of the radiation received, but only the amount accumulated.

Thermoluminescent dosimeters (TLD) operate essentially inversely to (passive) film dosimeters, as it is the emissivity that is measured in these. They are made up of a crystal, normally of calcium fluoride or lithium fluoride, with changing emissivity depending on the amount of radiation received. They require a photomultiplier to perform a reliable reading and have the disadvantages also described for film dosimeters. Although their duration is longer than that of a film dosimeter, this is very limited over time. One example of an embodiment of this type of dosimeters can be seen in U.S. Pat. No. 4,240,992.

Digital dosimeters have electronic and signal processing sensors. They can provide information about the specific dose as well as the accumulated dose.

EP 0 487 432 discloses an individual electronic dosimetric installation with individual dosimeters consisting of at least two subassemblies, the first subassembly of which constitutes an electronic dosimeter strictly speaking, as well as an identification body, and a second subassembly constitutes a device for transmissions by carrier wave able to perform exchanges or transmissions of data between this first subassembly and an electronic reading device placed in each access to this zone. Said electronic reading device comprises means to process the measuring and identification data which is transmitted to this by each dosimeter, and means for transmitting a control signal to the dosimeter, basically for proximity, intended to activate the second subassembly in order to trigger off transmission by carrier wave of the measuring and identification data.

EP A 0 450 992 describes a portable electronic dosimeter for measuring the flow of doses by means of a detection circuit associated with a microprocessor. A coupling device cooperates with the microprocessor and comprises an emitting and receiving assembly, as well as a switch allowing the form of operation to be chosen, in reception or emission mode.

ES 0 297 495 describes a system for a personal dosimeter filter for quantitative determination of radioactive exposures, comprising a tantalum filter sufficiently thick to block X-rays, γ (gamma) rays of energies approximately under 35 Kev and beta radiation; an iron filter; a plastic filter, with sufficiently thick iron and plastic filters to provide similar attenuation of hard beta radiation; and an open window; with said iron and plastic filters and the aforementioned open window providing similar attenuation of photonic energies over approximately 50 Kev.

ES 0 482 308 A1 discloses a procedure for automatic reading of the dose of irradiation of a portable dosimeter with an ionization chamber, in which it has a capacity $C_1$ consisting in measuring the value of the ionization chamber charge for each reading and memorising the value of the ionization chamber charge for each reading, and which later calculates at any given instant the dose D of irradiation from one of the previously memorized values and from the value of the chamber charge at that instant.

ES 205121 A1 with priority to NL 1951 0 163 643 describes a portable dosimeter for radioactive radiation which comprises an ionization chamber, one of whose electrodes is connected to an electrometer with the ionization chamber and the electrometer being housed in a common casing and with said electrode along with all the parts conductively connected to this being placed inside the casing, characterised in that a further two electrodes are placed inside the casing and conducted outside.

ES 2 215 490 A1 describes a dosimeter-carrier housing a passive dosimeter, as well as a radiation alarm, so that when the radiation received exceeds a specific level, the audible and light signals emitted by the alarm give the user an instant valuation of the amount of radiation that is being received at any time.

ES 8704641 discloses a radiation dosimeter which comprises a chip which has a microcomputer, an analog-digital converter which is connected to a data line, a voltage threshold detector (VTD) connected to the range resistance and electrical switches with individual control lines, a triple sensor with capacitive sensors with anode and cathode conduits, a replaceable energy source, a visual representation device and audible alarm.

One of the problems with dosimeters is that they generally cover a limited spectrum, as there is a range of frequencies in which they are reliable, whereas the radiation received in other frequencies is not reliable, as it provides unreal information. More specifically, single sensors are not used for radiations of γ (gamma) and X-radiation, as the sensors tested, though they may perform linearly for doses of γ (gamma) type, are substantially not reliable at all for X-radiation, since X-radiation is sinusoidal, whereas γ (gamma) type radiation is cadential, that is, by peaks or impacts. This makes it difficult to use a single sensor or single type of sensor in instruments for measuring the dose of radiation.

Hence, some of these dosimeters comprise different sensors for the different ranges, and it is the combination of these which gives the information on the dose received. The degree of reliability is furthermore relatively poor for low-intensity radiations, especially in the X range.

It is desirable to use a single sensor, as using multiple sensors for different types of radiation entails several disadvantages:
  Environmental radiation, which is detected by all these;
  The electrical consumption meant by powering two or more sensors, multiplying the energy required, and penalising the duration of the electrical accumulation devices on one hand, and also requiring the accumulator to have a larger size and charge;
  The need to have an electronic circuit combining the signals received from the multiple sensors, which also increases the power and electrical consumption requirements;
  Size and weight of the dosimeter.

Although using a single sensor is desirable, to properly evaluate X-radiation it could be necessary to have different sensors and/or amplification stages for the sinusoidal form and square-wave form radiation received.

Using a single sensor for receiving sinusoidal X-radiation and γ (gamma) radiation minimises these drawbacks and means that workers exposed to moderate levels of radiation (personnel classified in category B), can be supervised and monitored dosimetrically, making use of these devices; it is nevertheless designed within the scope of the invention that the dosimeter should comprise more than one sensor and/or more than one amplification stage with different processing for the sinusoidal X or γ (gamma) signal received, on one hand, and the square-wave X signal, on the other.

SUMMARY OF THE INVENTION

The subject of this invention is a dosimeter which comprises:
  A single sensor, provided with its own amplification stage for sinusoidal X-radiation and γ (gamma) radiation; preferably using a PIN type diode as its sensor;
  A radiation sensor filter, transparent to γ (gamma) radiation but sensitive to X-radiation, so as to correct the values received in the X range to a value contained within admissible margins of error;
  A circuit for reception of the signal received by the radiation sensor, and conversion of this signal to a dose value or value which can be interpreted as a dose of ionizing radiation; this circuit comprises an element for measuring the instantaneous signal at regular intervals of high frequency; said circuit will be provided with a single identifier; the element for measuring the instantaneous signal evaluates the intensity of the signal received and establishes a correction of the value of said signal according to the values of the preceding readings, so that the type of radiation received can be determined based on said correction and thus get a fairly accurate dosage value;
  a rechargeable electrical accumulator;
  a memory module in which the information on the dose received in the set period is stored;
  a circuit for recharging the electrical accumulator, which can be provided with a coil or induction circuit for wireless recharging when the dosimeter is placed on a recharging base; it is nevertheless also designed for the recharging circuit to be able to be powered by wiring;
  a communications module, which can either be wired or wireless;
  the communications module and the recharging module can be shared in a single multi-pole cable in the event of the connection between them being wireless;
  A sealed casing, normally made of a plastic material;
  Optionally, one or more integrated or internal (LED) indicators in the sealed casing which enable different parameters of the dosimeter to be displayed, such as the state of the battery, the need to place the dosimeter on its control base for downloading data, or indications of the value of the accumulated dose; said indicators will be placed inside the casing, and can for example be in transparent parts of said casing, or in zones with thinner walls to make them translucent;
  Optionally, a second sensor for square-wave X-radiation; since there are devices which generate X-radiation in square-wave form which can lead to problems with the reliability of the reading the dosimeter has been designed to comprise a second sensor, identical to the first one, provided with its corresponding amplification stage or with a second amplification stage different to that of the first sensor, which processes the signal received differently when this is in square-wave form, on one hand, or sinusoidal or cadential, on the other, so as to correct any deficiencies which could arise in the case of single-sensor dosimeters with a single amplification stage;

What has been described above is also compatible with the presence in the dosimeter of an audible alarm for indicating battery discharge or the need to download the data contained in this.

The invention extends to a device for controlling the dosimeter which in turn comprises:

A processing unit;
A memory module;
Normally, an integrated clock;
A base for recharging the dosimeter; this recharging base can be wired or use another physical connection or induction;
A communications module, either wired or wireless, with the dosimeter;
A communications module with an external database, normally of an intranet; or with a PC in local mode, to enable recording the levels of radiation detected, as well as establishing communication with the user, indicating, amongst other functions, the status of the device (charge level, alarm levels, any need for calibration or verification, etc.)

Each element in the system is provided with a software or firmware which controls and processes the different elements involved.

The dosimeter is personal for one user, being specially designed for this to constitute the system for supervision and radiological monitoring of workers exposed to a moderate risk from radiation: personnel classified as category B, as defined in Directive 80/836/Euratom. The system nevertheless allows other compatible uses, such as for example the operational supervision of exposed personnel, in both category B and A, or the optimisation of processes with exposure risk, etc.

A user subject to ionizing radiation risk must carry a device for measuring the radiation received. The dosimeter now being proposed is a personal dosimeter, insofar as this stores accumulated doses. Since the information is transferred to a database, however, the internal memory is reset after the information has been transferred. For this reason, though it will normally be used by a single person, a dosimeter can also be used by different persons in different periods of time, after resetting and the proper registration (clearing the memory banks) on the change of user.

The dosimeter receives a set of excitation signals from a single sensor, corresponding to the different types of ionizing radiation, so that the sensor receives excitation signals of cadential γ (gamma) radiation (in an irregular or regular cadence) i.e. this is not a continuous signal but seen as peaks or "bursts" of radiation. Apart from this, X-radiation signals are also received. This X-radiation is nevertheless displayed as a continuous sinusoidal signal, for which reason it cannot be measured in the same way as γ (gamma) radiation. Furthermore, for a certain type of sensors, X-radiation is overstated, so that while this exists in terms of doses of a much lower value, it is displayed more intensely than it should be, which gives rise to incorrect values of doses. For this purpose the sensor has been provided with a filter for attenuating γ (gamma) radiation consisting of a copper plate. This copper plate does not have any attenuating effect on γ (gamma) radiation, and it corrects and linearizes the ranges of X-radiation, drawing these closer, in terms of doses, to the corresponding ones for γ (gamma) radiation received. It can nevertheless have a second sensor identical to the previous one and/or a second amplification stage, different to the previous one, to send the signal reception circuit the information on X-radiation waves, which may be eliminated or undervalued by the first sensor. This system, though it penalises electrical consumption, does so to a small extent since the signal processor will normally receive the accumulated information from both sensors.

The dose is the accumulated radiation received. Hence, according to the invention, the values of doses considered as the sum of X-radiation and γ (gamma) radiation are measured at regular intervals of time, the sum of said values being what is interpreted and converted into dose value and stored in the memory of the dosimeter.

The electronic circuit associated with the sensor is powered by an electrical accumulator. The electrical accumulator is small in size, so this means the dosimeter does not have to be large, and for this reason it has been possible to obtain a minimum size and maximum duration, estimated at over 100 hours, with a basic configuration. The electrical accumulator nevertheless obviously becomes discharged and needs to be regularly recharged. Preferably, the dosimeter nevertheless must be sealed and as far as possible avoid any physical connectors which may accumulate dirt, impair the operation of the device and make this more expensive. For this reason the dosimeter has been provided with a circuit for recharging by induction when said dosimeter is detected by a charging base; simultaneous recharging activates the communications circuit which is also powered in the recharge phase as this communications circuit is deactivated in ordinary operation, and does not therefore consume any power. When the communications module is activated the data is transferred to the reading device of the charging base, and the memory data is reset for a new cycle, in which the dosimeter can be used by the same person or by another, by means of proper identification of the other person.

The reader of the charging base will be directly or indirectly connected by wire or by wireless means to a management database, normally a remote database of an external radiological control centre.

BRIEF DESCRIPTION OF THE FIGURES

In order to illustrate the explanation that is to follow, we are enclosing with this descriptive report five pages of drawings and/or diagrams, in which eight figures represent the subject of this invention, merely as an example, without implying any limitation thereto, and in which.

DESCRIPTION OF THE FORMS OF EMBODIMENT OF THE INVENTION

Figure 1:
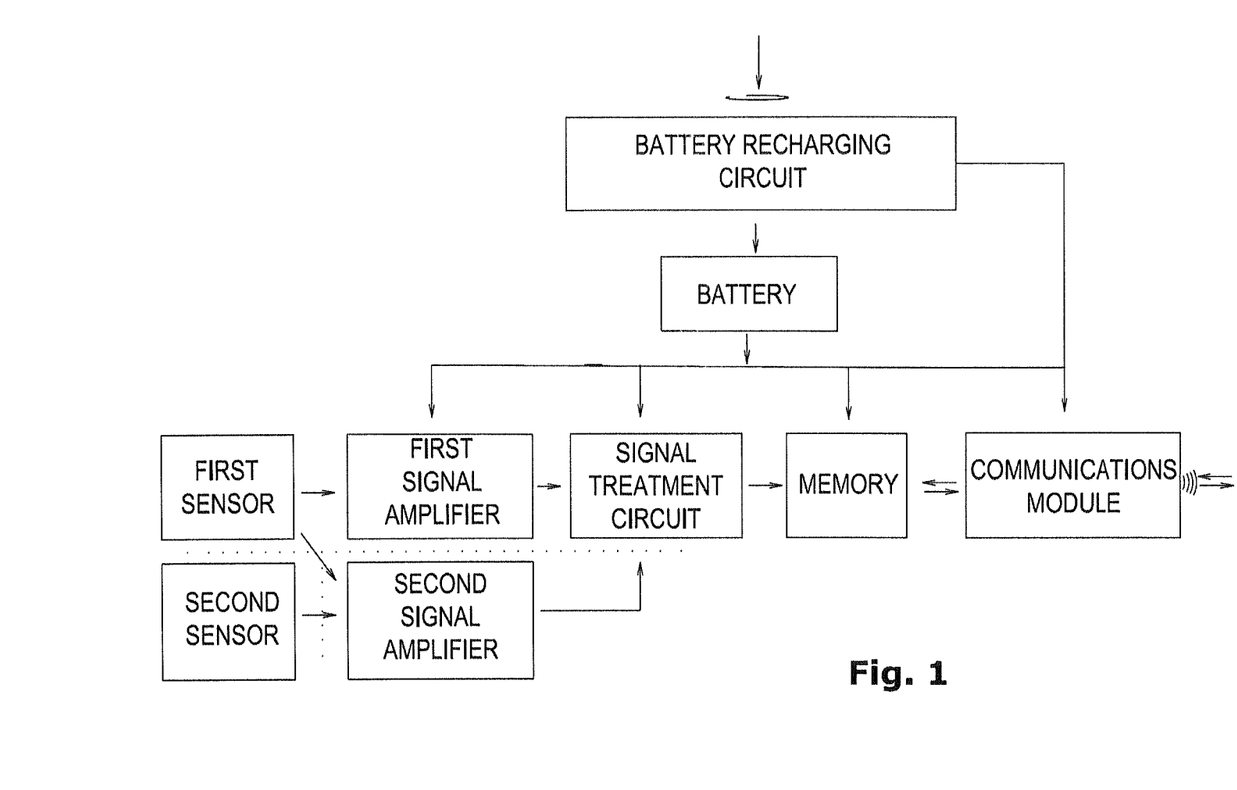
FIG. 1 shows a basic diagram of the dosimeter of the invention.
Figure 2:
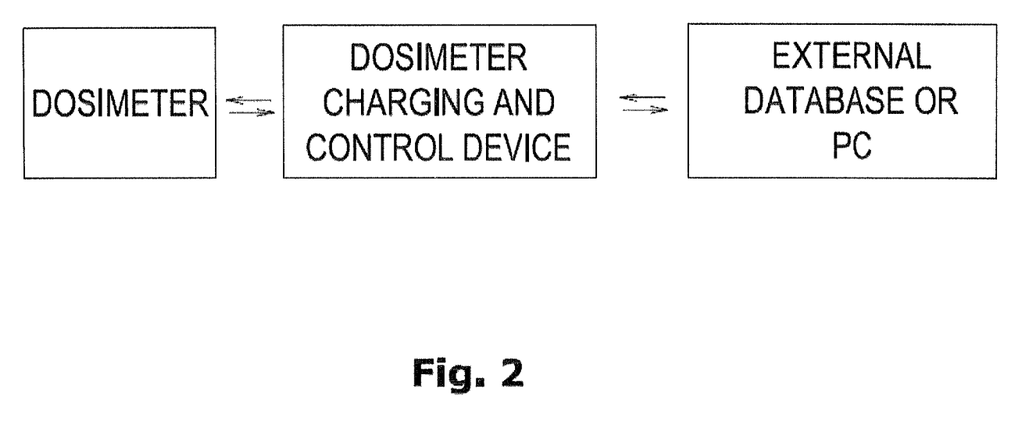
FIG. 2 shows a diagram of the set of devices of the dosimeter, including the external elements for recharging and storing data.
Figure 3:
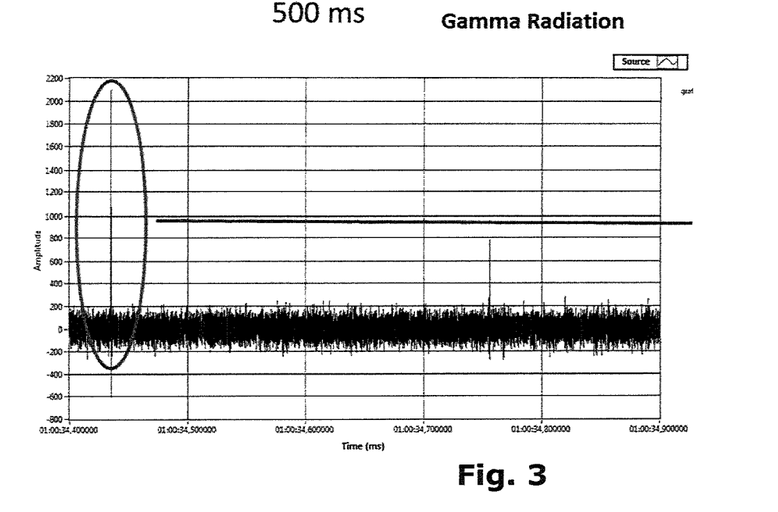
FIG. 3 shows a graph of a standard reception of γ (gamma) radiation.
Figure 4:
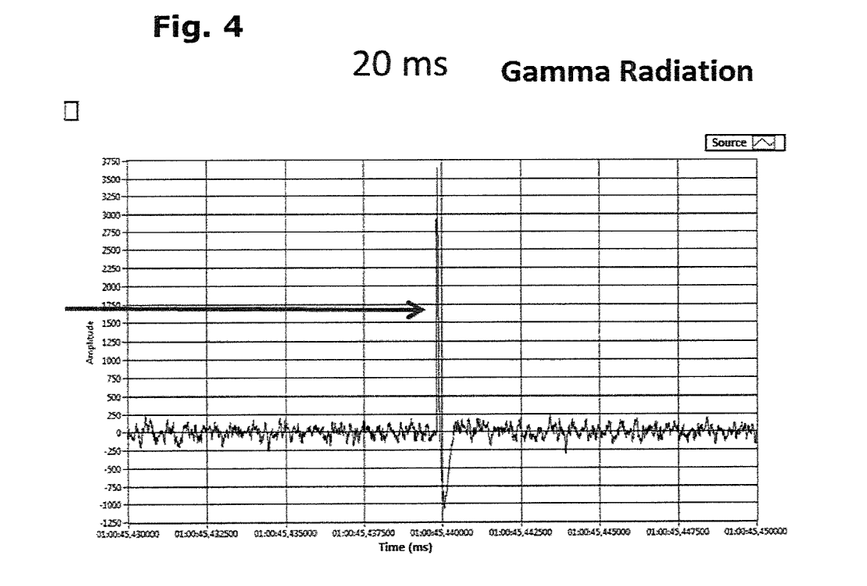
FIG. 4 shows a graph with a detail of the signal received as represented in FIG. 3 with extended scale division.
Figure 5:
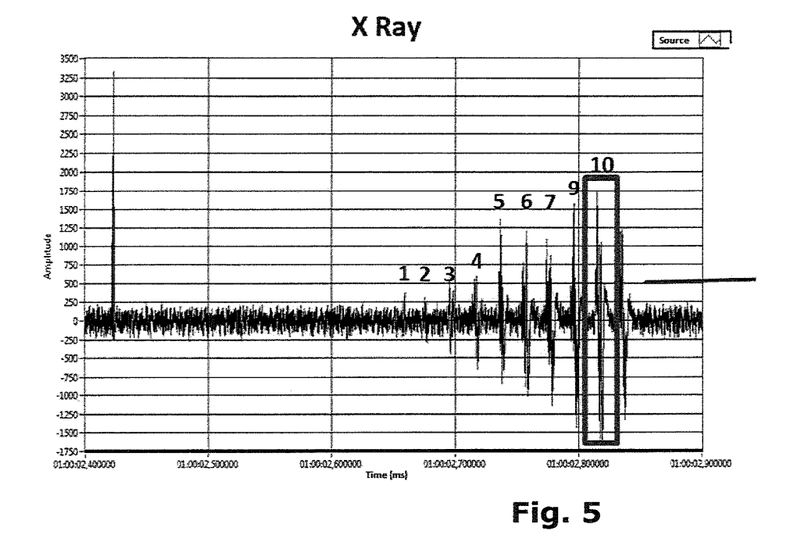
FIG. 5 shows a graph of a standard X-radiation reception.
Figure 6:
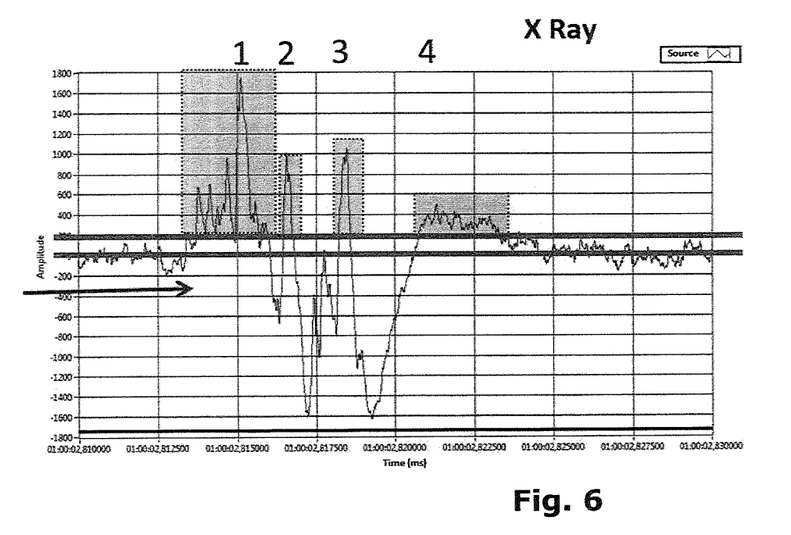
FIG. 6 shows a graph with a detail of the signal received as represented in FIG. 5 with extended scale division.
Figure 7:
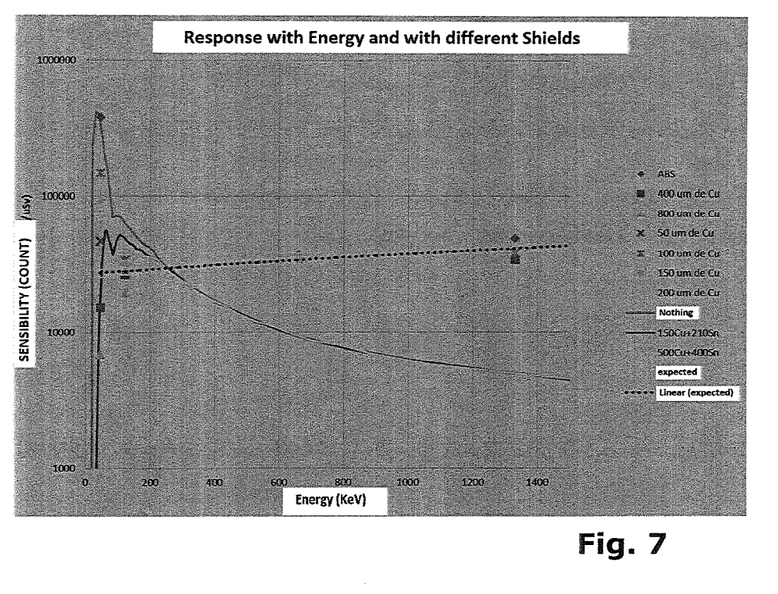
FIG. 7 shows a graph displaying the correction of the X-radiation zone and the γ (gamma) radiation zone, with different correction factors depending on the filter used.
Figure 8:
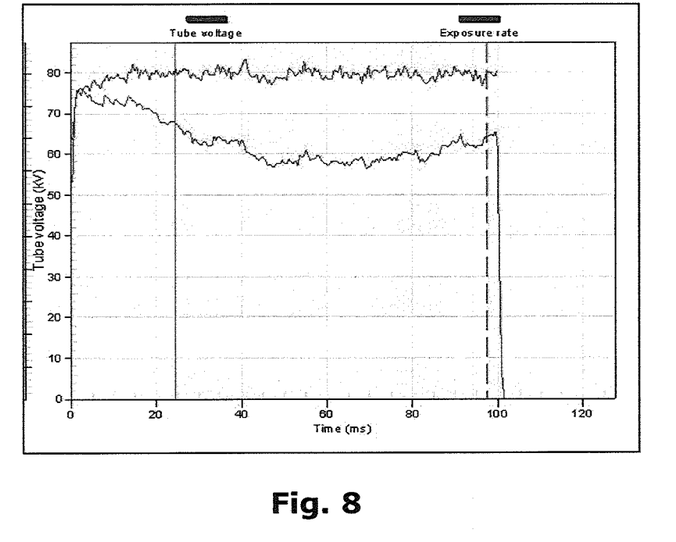
FIG. 8 shows a graph of square-wave X-radiation.

There thus follows a description of a dosimeter for personal control of the dose of ionizing radiation to which a user is subject because of their usual work.

As has already been stated, the dosimeter is preferably made up of a sealed body which comprises, inside this:

- A sensor, with an amplification stage, which transmits to an electronic circuit the sinusoidal X-radiation and γ (gamma) radiation signal received;
- A filter of this sensor, which corrects the overstatement of the X range in the radiation received; this filter consists of a sheet of copper which covers the sensor;
- An electronic circuit for transformation of the signal, provided with the corresponding software; this electronic circuit receives the signal from the amplification stage for its processing;
- A memory circuit; said memory circuit may form part of an integrated circuit or constitute a separate module;
- A rechargeable electrical accumulator;
- A circuit for recharging the electrical accumulator, and
- A communications circuit activated and/or powered with the circuit for recharging the electrical accumulator, so that said communications circuit does not consume any power during use, maximising the operating time of the device.

During use, the dosimeter receives impacts of radiation, which are filtered and measured by the sensor at regular intervals, in the order of micro-seconds or at even shorter intervals of time, even under one microsecond, so that with the copper filter used this corrects, in terms of doses, the intensity of the X-radiation and γ (gamma) radiation received. The signal received is evaluated by the electronic circuit for transformation of the signal, in accordance with the intensity of the preceding impacts of radiation, turning the signal received into a dose value or a value that can be interpreted as a dose. This data is recorded accumulatively in the memory circuit. Hence, the memory saves only the dose accumulated from the last period in which the device has been reset.

When the dosimeter is subjected to square-wave X-radiation, in order to make the information obtained more accurate, said dosimeter may have a second sensor, identical to the previous one, and/or a second amplification stage, which will transform the excitation signal received differently to the way the first amplification stage does this, entering the relevant data into the electronic circuit, preferably in a single input, but also possibly in different inputs, for a single processing of the radiation received and its transformation into dosage terms. When a second sensor is used, said second sensor could also be provided with a filter identical to that of the first sensor, or with a filter different to that of the first sensor.

When the battery is about to reach a minimum charge threshold, a light or audible alarm is designed to be activated so that the user can proceed to charge the device.

The dosimeter cooperates with a dosimeter control device, which comprises:

- A processing unit;
- Normally, a memory module;
- Normally, an integrated clock;
- A recharging base for the dosimeter; this recharging base can be by means of a wire or another physical connection, or by induction;
- A wired or wireless module for communications with the dosimeter;
- A module for communications with an external database, normally of an intranet;

According to a preferential form of the invention the dosimeter recharging base and the module for communications with the dosimeter are integrated in a single unit.

This recharging base preferably comprises an inductor circuit for wireless recharging of the electrical accumulator, but it is designed and within the scope of the invention for the recharging connection to be by means of a conventional wired connection.

The data downloading device is furthermore fitted with means of wireless communication, for example by Bluetooth. The scope of the invention nevertheless includes the data communication being able to connected by wire.

Insofar as the duration of the electrical accumulator is limited, the user must recharge this every so often. If the data uploading and downloading has not been performed, the user is nevertheless warned by the dosimeter or by the recharging unit (or by means of external dosimetric monitoring services connected to the recharging unit, for example by sending an SMS to a registered number) that the electrical accumulator of the dosimeter must be recharged and the data downloaded to the data downloading device.

Said data downloading base stores and/or transmits the information to a database of the external dosimetric monitoring services, which will keep a record of the dosage received by each user, and may issue reports in order to take corrective action or isolate the user from sources of radiation, if a high threshold of radiation had been reached.

In accordance with a specific embodiment of the invention, the base for charging the dosimeter and downloading data may be connected to a PC, and it could be said PC which keeps in touch with the dosimetric monitoring services.

According to another, less preferred embodiment, the dosimeter charging base can be independent from a PC, but the data downloading and resetting of the memory circuit can be performed by the wireless communication system of the PC.

What is claimed is:

1. A dosimetric monitoring device, comprising:
    a dosimeter with at least one sensor for radiation and a rechargeable electrical accumulator;
    a circuit for recharging the electrical accumulator;
    wherein the dosimeter comprises:
        a first radiation sensor for detecting sinusoidal X-radiation and γ (gamma) radiation;
        a filter for the first radiation sensor, which is transparent to γ (gamma) radiation but sensitive to X-radiation, the filter adapted to correct overstated values received in an X range to a value within admissible margins of error;
        a first amplification stage for amplifying a signal from the first radiation sensor to produce an amplified signal;
        a circuit for processing the amplified signal of the first radiation sensor, and converting said amplified signal into one of:
            a dose value and
            a value that can be interpreted as a dose;
        a memory module in which information on the dose received in a fixed period is stored;
        a communications module;
        a second radiation sensor for square-wave X-radiation, with a corresponding second amplification stage, said second radiation sensor being identical to the first radiation sensor, and said second amplification stage being separate from the first amplification stage for the first sensor; and a dosimeter control device with at least one base for recharging the dosimeter, said base provided with:
   a recharging circuit; and
   a system for communication with the dosimeter;
wherein the second amplification stage for square-wave X-radiation is connected to the first X-radiation sensor, said second amplification stage being different from the first amplification stage.

2. A dosimetric monitoring device, according to claim 1, wherein at least one of the first and second radiation sensors include a PIN type diode.

3. A dosimetric monitoring device, according to claim 1, wherein the dosimeter monitoring device also comprises a communications module with an external database.

4. A dosimetric monitoring device, according to claim 1, wherein the dosimeter monitoring device also comprises:
   a processing unit;
   a memory module; and
   a communications module with the dosimeter.

5. A dosimetric monitoring device, according to claim 1, wherein the first radiation sensor is an ionizing radiation sensor that comprises a meter for displaying an intensity of an instantaneous signal at regular intervals at high frequency.

6. A dosimetric monitoring device, according to claim 1, wherein the circuit for recharging the electrical accumulator of the dosimeter and the circuit for recharging the recharging base respectively include different coils which perform wireless recharging by induction.

7. A dosimetric monitoring device, according to claim 1, wherein the communications module of the dosimeter and a module of the base for recharging communications with the dosimeter are of a wireless type.

8. A dosimetric monitoring device, according to claim 1, wherein the dosimeter comprises a sealed external casing.

9. A dosimetric monitoring device, according to claim 8, wherein the dosimeter comprises a set of indicators which are at least one of visual and audible, placed outside or inside the external casing, for indicating different parameters including but not limited to the state of the electrical accumulator, the need for charge of the electrical accumulator, the need for downloading data, and a value of an accumulated dose.

* * * * *